(12) United States Patent
Castelli et al.

(10) Patent No.: US 10,831,800 B2
(45) Date of Patent: Nov. 10, 2020

(54) QUERY EXPANSION

(71) Applicant: International Business Machines Corporation, Armonk, NY (US)

(72) Inventors: Vittorio Castelli, Croton on Hudson, NY (US); Radu Florian, Danbury, CT (US); Taesun Moon, Scarsdale, NY (US); Avirup Sil, Ossining, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 582 days.

(21) Appl. No.: 15/248,974

(22) Filed: Aug. 26, 2016

(65) Prior Publication Data
US 2018/0060421 A1 Mar. 1, 2018

(51) Int. Cl.
*G06F 16/00* (2019.01)
*G06F 16/33* (2019.01)
*G06N 20/00* (2019.01)
*G06N 5/04* (2006.01)

(52) U.S. Cl.
CPC ...... *G06F 16/3338* (2019.01); *G06F 16/3349* (2019.01); *G06N 20/00* (2019.01); *G06N 5/04* (2013.01)

(58) Field of Classification Search
CPC ......... G06F 17/30672; G06F 17/30693; G06F 17/30696; G06F 16/3349; G06F 16/3348; G06F 16/3338; G06F 16/3339; G06N 5/04; G06N 20/00
USPC ........................................ 707/722, 730, 740
See application file for complete search history.

(56) References Cited

U.S. PATENT DOCUMENTS

| 7,636,714 | B1* | 12/2009 | Lamping | G06F 16/3338 |
| 7,925,498 | B1* | 4/2011 | Baker | G06F 16/3338 |
| | | | | 704/9 |
| 8,103,669 | B2 | 1/2012 | Castellani et al. | |
| 8,195,683 | B2 | 6/2012 | Bolivar | |
| 8,239,377 | B2* | 8/2012 | Milic-Frayling | G06F 16/9535 |
| | | | | 707/722 |
| 8,301,764 | B2* | 10/2012 | Konig | H04L 67/20 |
| | | | | 709/224 |

(Continued)

OTHER PUBLICATIONS

Mel, et al. "The NIST Definition of Cloud Computing". Recommendations of the National Institute of Standards and Technology. Nov. 16, 2015.

*Primary Examiner* — Jean M Corrielus
(74) *Attorney, Agent, or Firm* — Anthony Curron, Esq.; McGinn Law Group, PLLC

(57) ABSTRACT

A query expansion method, system, and computer program product, include establishing a context of a query to execute the query within a search index by labeling phrases of interest of the query, expanding of the phrases of interest based on a language model and a topic model, and identifying and incorporating an available historical query into the context according to a historical phrase of interest and an expansion of one or more historical phrases of interest, and retrieving and displaying one or more search results based on the query and the context of the query as a first visual mark indicating a linkage between one or more terms of the query and the one or more search results and a second visual mark indicating an alignment between the available historical query and a match to the terms of the query and the search result.

19 Claims, 4 Drawing Sheets

(56) References Cited

U.S. PATENT DOCUMENTS

| | | | | |
|---|---|---|---|---|
| 8,589,429 B1* | 11/2013 | Thirumalai | ......... | G06F 16/2228 |
| | | | | 707/766 |
| 8,713,418 B2* | 4/2014 | King | ................ | G06Q 30/02 |
| | | | | 715/200 |
| 9,235,653 B2* | 1/2016 | Talmon | ............... | G06F 16/9024 |
| 9,330,165 B2* | 5/2016 | Jiang | ................ | G06F 16/90324 |
| 9,690,851 B2* | 6/2017 | Nauze | ................ | G06F 16/9535 |
| 9,811,728 B2* | 11/2017 | King | ................ | G06F 16/93 |
| 10,204,121 B1* | 2/2019 | Thirumalai | ......... | G06F 16/3322 |
| 2008/0195601 A1* | 8/2008 | Ntoulas | ................ | G06F 16/313 |
| 2010/0211588 A1* | 8/2010 | Jiang | ................ | G06F 16/90324 |
| | | | | 707/768 |
| 2010/0223257 A1* | 9/2010 | Milic-Frayling | ... | G06F 16/9535 |
| | | | | 707/722 |
| 2015/0006501 A1* | 1/2015 | Talmon | ............... | G06F 16/9024 |
| | | | | 707/708 |
| 2015/0379081 A1 | 12/2015 | Lester et al. | | |
| 2016/0147775 A1* | 5/2016 | Nauze | ................ | G06F 17/2785 |
| | | | | 707/740 |
| 2016/0378763 A1* | 12/2016 | Geupel | ................ | G06F 16/353 |
| | | | | 707/730 |

\* cited by examiner

QUERY EXPANSION METHOD 100

QUERY EXPANSION

STATEMENT REGARDING FEDERALLY SPONSORED RESEARCH OR DEVELOPMENT

This invention was made with Government support under Contract No. HR0011-12-C-0015 awarded by the Defense Advanced Research Projects Agency (DARPA). The Government has certain rights to this invention.

BACKGROUND

The present invention relates generally to query expansion and more particularly, but not by way of limitation, to establishing a context of a query based on historical queries and the current query to retrieve a query result that visually marks alignment between query terms and hits.

In a question answering method (or a search engine), it is common practice to perform query expansion to reduce the number of misses. Query-expansion-like techniques can also be used to validate candidate answers against the question or query.

Query expansion is conventionally based on log analysis of related questions. However, conventional techniques are limited in that little contextual information is used to decide how to expand or even what to expand in the query and extensive query log information is required to utilize the conventional techniques. Indeed, in the conventional techniques, searches are not linked and independent. Moreover, pronouns and the like in subsequent searches are meaningless.

Thus, some embodiments of the invention have realized an exemplary technical solution to one or more technical needs in the art.

SUMMARY

In an exemplary embodiment, the present invention can provide a computer-implemented query expansion method, including establishing a context of a query to execute the query within a search index by labeling phrases of interest of the query, expanding of the phrases of interest based on a language model and a topic model, and identifying and incorporating an available historical query into the context according to a historical phrase of interest and an expansion of one or more historical phrases of interest, and retrieving and displaying one or more search results based on the query and the context of the query as a first visual mark indicating a linkage between one or more terms of the query and the one or more search results and a second visual mark indicating an alignment between the available historical query and a match to the terms of the query and the search result.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the present invention may readily be utilized as a basis for the designing of other structures, methods and systems. It is important, therefore, that the claims be regarded as including equivalent constructions within the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
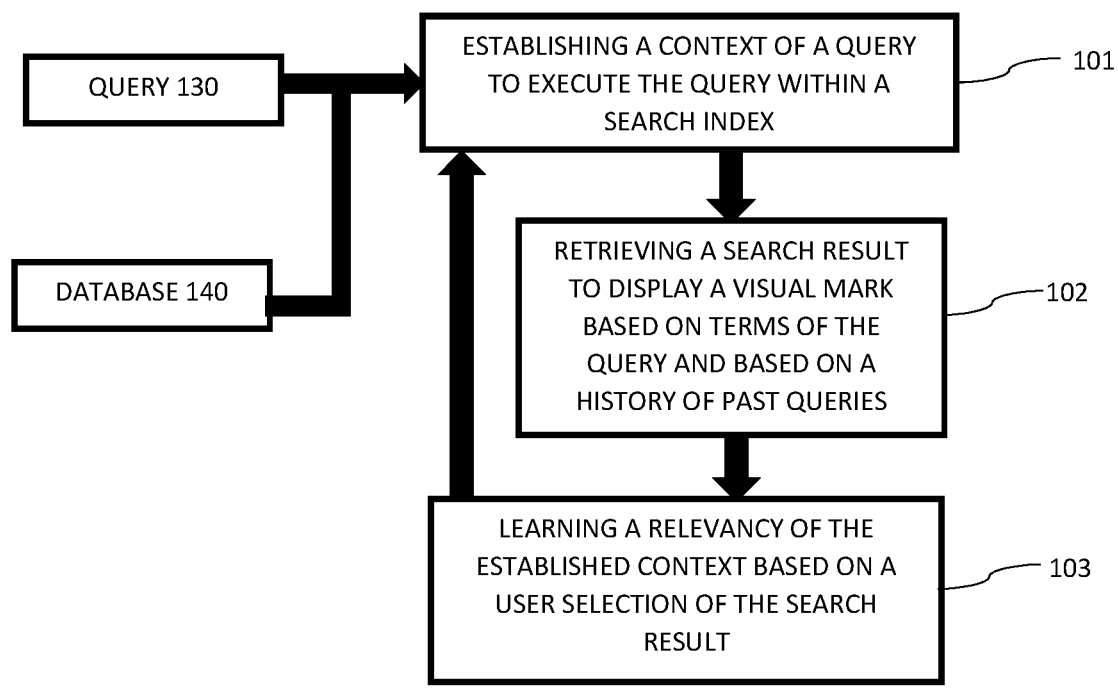
FIG. 1 exemplarily shows a high-level flow chart for a query expansion method 100.

The invention will now be described with reference to FIG. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity.

By way of introduction the example depicted in FIG. 1, a query expansion method 100 embodiment according to the present invention can include various contextual steps, e.g., a history of relevant hits, visually marking alignment between a search result, the query and/or query history. By way of introduction the example depicted in FIG. 2, one or more computers of a computer system 12 according to an embodiment of the present invention can include a memory 28 having instructions stored in a storage system to perform the steps of FIG. 1.

Thus, a query expansion method 100 according to an embodiment of the present invention may act in a more sophisticated, useful and cognitive manner, giving the impression of cognitive mental abilities and processes related to knowledge, attention, memory, judgment and evaluation, reasoning, and advanced computation. In other words, a "cognitive" system can be said to be one that possesses macro-scale properties—perception, goal-oriented behavior, learning/memory and actions generally recognized as cognitive.

Although one or more embodiments (see e.g., FIGS. 2-4) may be implemented in a cloud environment 50 (see e.g., FIG. 3), it is nonetheless understood that the present invention can be implemented outside of the cloud environment.

Referring now to FIG. 1, in step 101, a context of a query 130 is established. That is, in step 101, the query 130 is structured to retrieve (e.g., using a search engine) relevant documents and/or passages from an existing corpus of interest e.g., an indexed database 140). The query is processed through a natural language processing (NLP) pipeline, which conducts tokenization, part-of-speech tagging and parsing. A trained statistical classifier may be applied to identify (e.g., label) phrases of interest (POI) which can be expanded to find relevant documents and/or passages in the search index defined over the corpus in order to identify the context of the query.

After identifying the phrases of interest (e.g., the context) in the query, the phrases of interest can be expanded using several knowledge bases, which generate expansion candidates for the POI, and then these candidates are ranked within the context of the query according to a statistically learned semantic topic model and syntactic language model. For example, a confidence value with a score is associated with each of the expanded candidates based on the semantic topic model and syntactic language model. In other words, the greater that a confidence value is associated with the expansion, the greater that a relevancy of the POI to the models.

That is, the phrases of interest in the query can be expanded using one or more query expansion techniques, such as by using a statistically-learned classifier, to identify phrase(s) of interest (POI) within the query. Such POI can be expanded, such as through an n-gram language model, to facilitate natural sounding expansions within the query context. Further, the POI can be expanded by a topic model that restricts expansions to lie within the current semantic space (e.g., makes sure that the query stays on topic), a dictionary of synonyms (e.g., thesaurus) which provides the candidate synonyms to be used in the expansion, a co-reference component which identifies snippets of texts that can be anaphoric and maps them to spans of text which occurred in previous hits as identified by the user, a topic segmentation model that controls the topic model for expansion, etc.

In some embodiments, in step 101, if a query history exists (e.g., of past queries by the user), information about such hits associated with the query history are incorporated into the context by processing the previous hits through the NLP pipeline and identifying mentions and relations of interest. If a query history exists, anaphoric expressions can be identified and mapped to sub-spans of associated historical hits. Moreover, previous mentions, relations, phrases of interest, and query expansion results can be incorporated into an expansion of the current query. In other words, contextual information to further classify the query can be incorporated into an expanded query. For example, an expanded query, which can include part or all of the current query, plus context from one or more historical queries, is input to a search engine, which has indexed the corpus of interest.

In step 102, hits from the expanded query (e.g., search result(s) from the indexed corpus) are returned, retrieved, or received and ranked in an order of relevancy. The hits can be displayed to include a visual alignment between terms of the current query 130 and the hits by expansion matches. For example, if the query comprises the term "data" and the search result returns "information", a visual marker indicating the link between "data" and "information" can be included. By way of further example, if the current query was expanded based on a history of past queries and associated hits, the current results (i.e., results of the instant query) can visually depict the history of past queries (i.e., results from a query previously performed) and (linking) matches between terms within hits and terms within queries. In yet another example, such links may be displayed within one or more pop-ups with matching terms highlighted.

In one embodiment, if a past query: "who is the lead actress in a (insert name of movie)?" results in a returns of "Jane Doe", if and a current query (e.g., the instant query at some point after the previous queries) comprises "what other movies is she in?," the context of the search based on the history can indicate that "she" is referring to "Jane Doe" such as by visually displaying a marker indicating that "she" refers to "Jane Doe" based on the history and "films" is in the context of "movies" for the current query. In other words, the hits display a visual marker indicating what part of the hits refers to the current query and the history of queries (e.g., between the instant query and any number of past queries). As such, subsequent searches can be mapped (i.e., linked) to prior searches. Thus, pronouns and the like are not problematic.

In some embodiments, the search engine returns a set of documents, which are then ranked by their relative relevance (e.g., relevant or not relevant) in relation to the context and past queries. The ranked results are then processed to mark POI (e.g., visually marking identified linked). For example, such POI can be marked according to whether they are exact matches of the POI or whether they are matches of expansions of the POI.

In step 103, a relevancy of the context that returned the search result(s) is learned based on a user selection of the search result. The search result(s) are displayed for the user to select such that the context of subsequent queries can be improved based on a selection. For example, the context of the query is determined to be more relevant if the user selects one or more search results and conversely, less relevant if the user ignores the search result(s). Thus, in step 103, search results can have greater accuracy by using phrases of interest or expansion techniques related to the relevant search results(s). In step 103, based on user response (e.g. selecting hits), query expansions when establishing the context are pruned from context (e.g., based on the context of the user's query) to focus a next interaction on hits with a greater relevance to the user.

Further, in step 103, the user can request to erase the history such that the context of the query 130 is only based on the query 130 itself and not the history of the user's queries. Thus, the user can create a "blank slate".

In some embodiments, un-selected results are eliminated from future queries. For example. if a query 130 requested: "health care congressional bills" and the user only selected results related to health care and government action, the context can be updated such that congressional bills not directed to health care are eliminated from future queries.

In some embodiments, terms can be expanded based on the context to find more relevant responses. For example, a user first inputs the query 130: "What are the benefits of exercise to cardiovascular health?" and the method 100 retrieves a set of answers, a subset of which satisfy the user, and the user indicates to the method 100 which answers satisfy them. Then the user inputs a second query: "Will these benefits last indefinitely?". And, the user further queries: "What are the benefits guaranteed by any health insurance as mandated by the Affordable Care Act?" Between the first and second query, in step 101, a context will be established by detecting that "these benefits" refers to the user selected answers from the first query and will conduct a search over such the retrieved set of benefits while also expanding the term "indefinitely" in an intelligent manner such that expressions that indicate "long periods of time" are sought. As an online model, the topic segmentation will apply a segmentation marker between the second and third query indicating that a new topic has started and so "benefits" are not in the same topic and thus cannot be co-referent. Therefore, the query context will be limited and the expansion performed with the assumption that prior query history does not apply. In other words, dialog path can be constrained and limited such that a query expansion is limited to dialog path/node.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
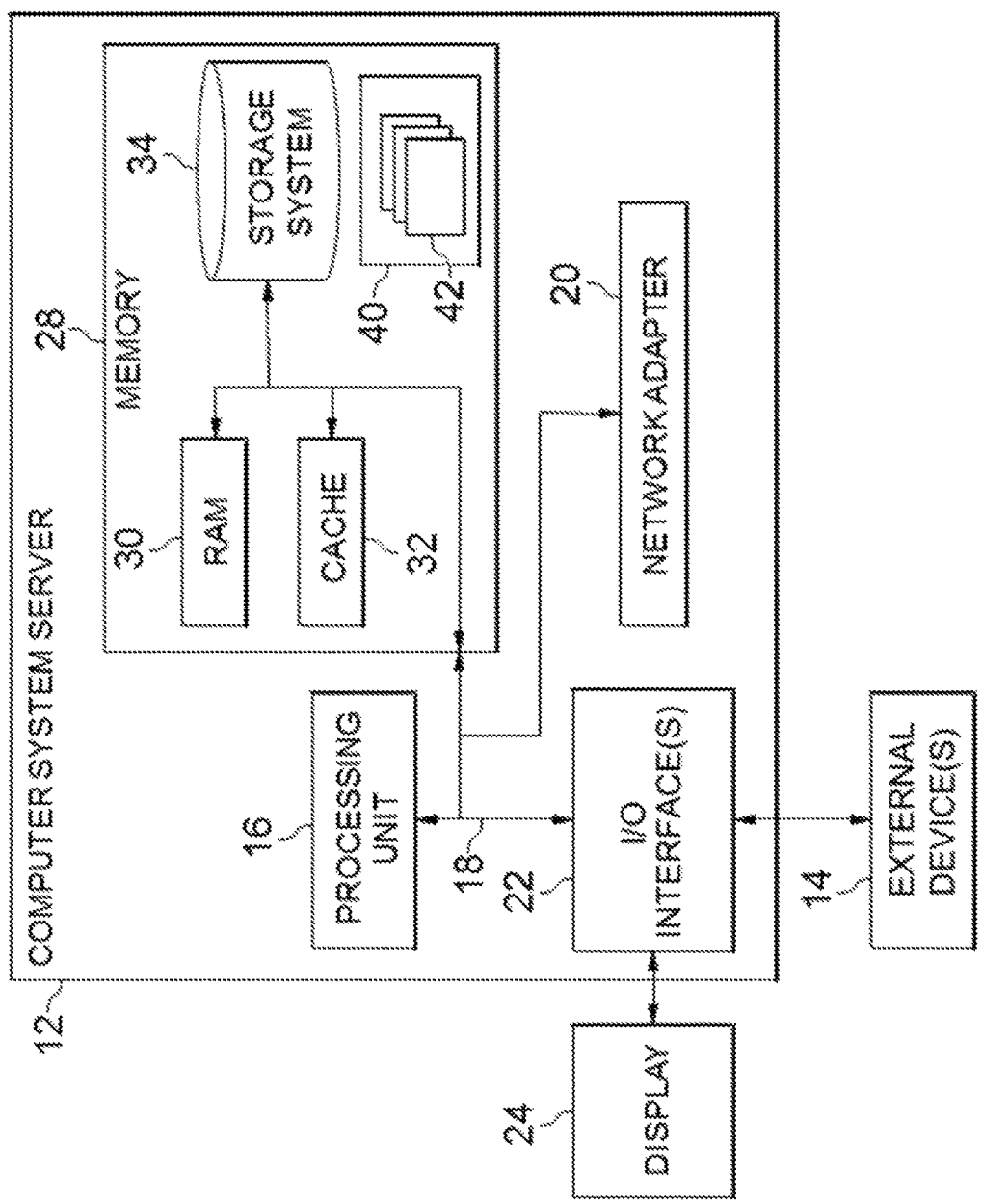
FIG. 2 depicts a cloud-computing node 10 according to an embodiment of the present invention.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 2, a computer system/server 12 is shown in the form of a general-purpose computing circuit.

The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 3:
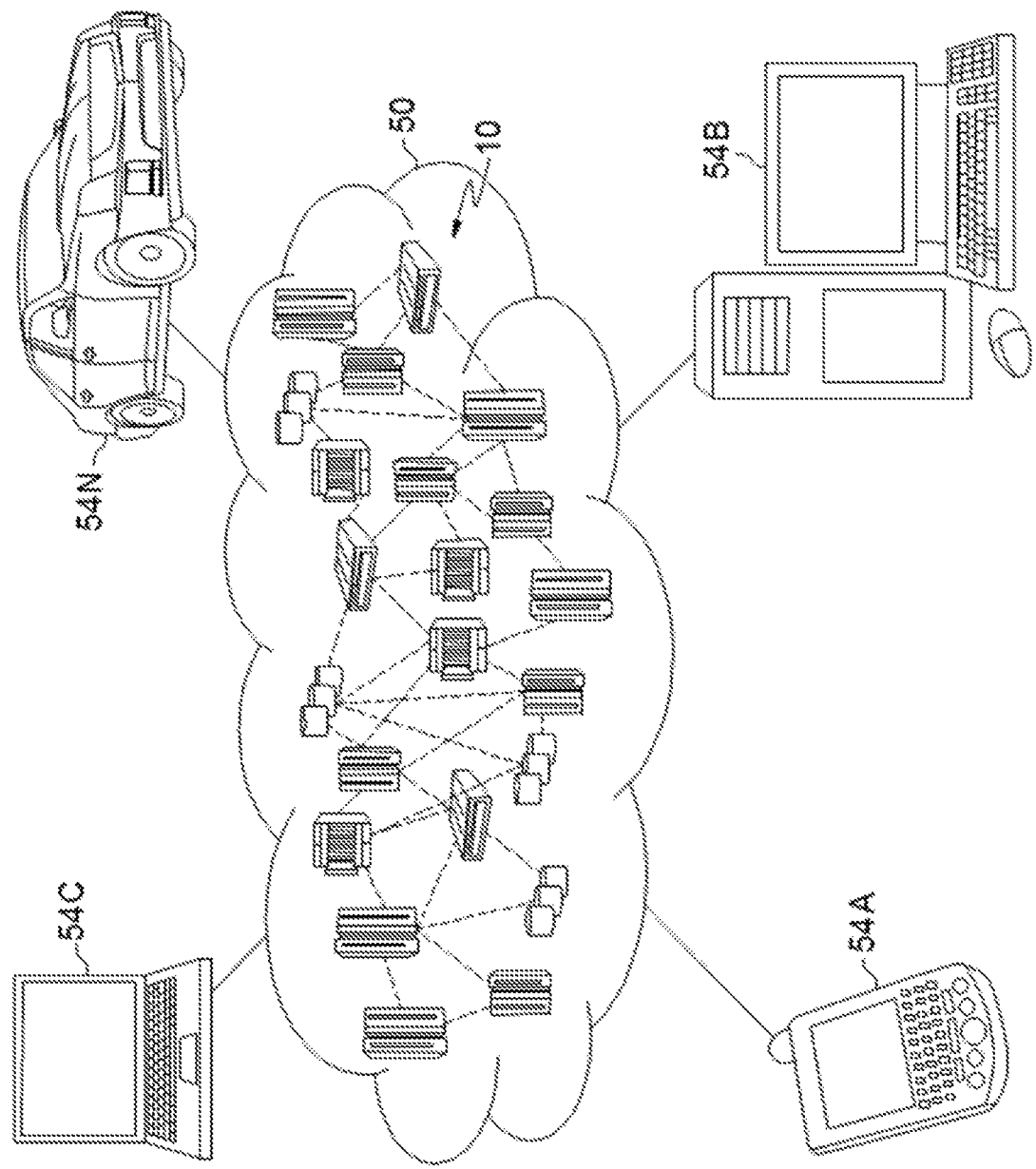
FIG. 3 depicts a cloud-computing environment 50 according to an embodiment of the present invention.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
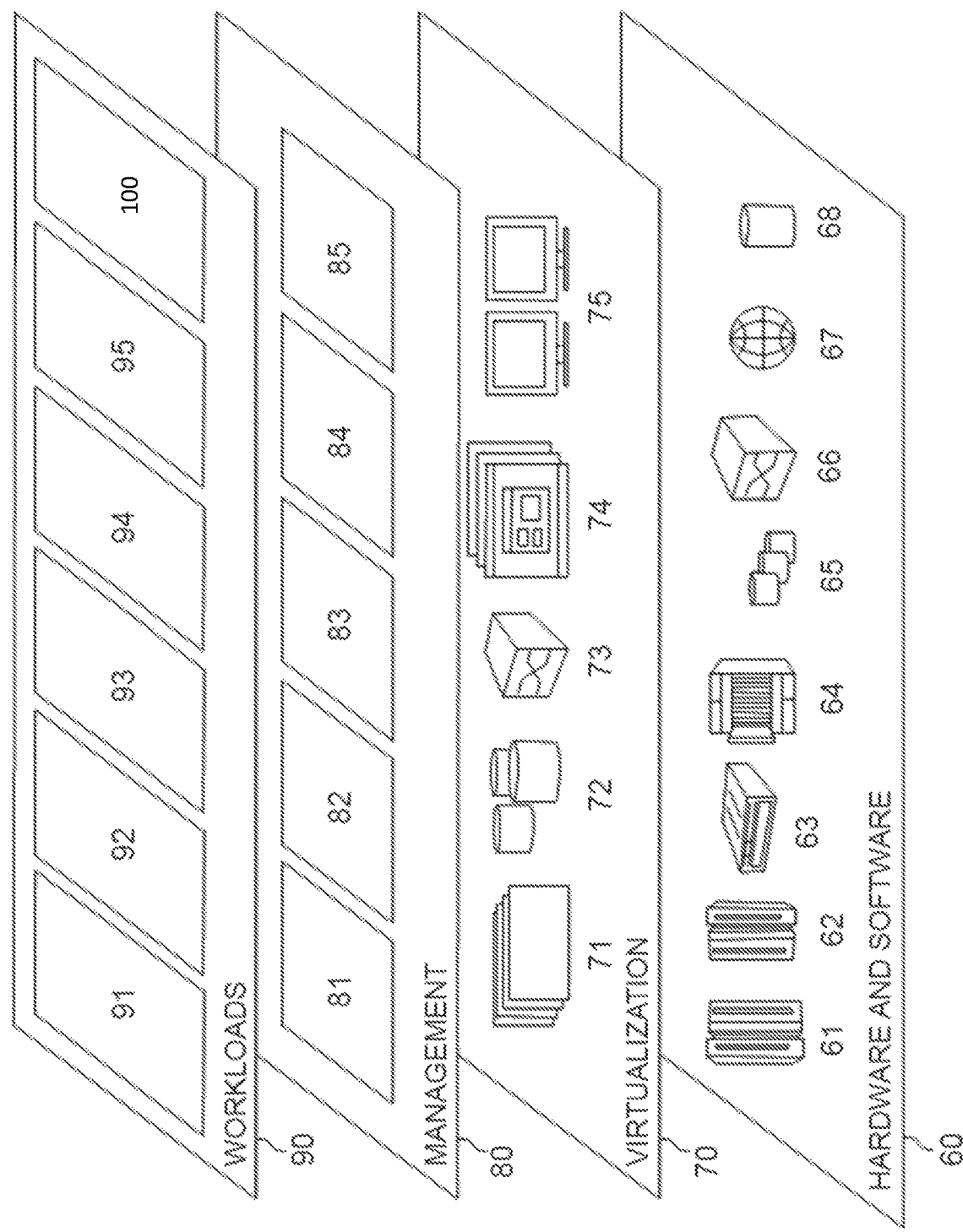
FIG. 4 depicts abstraction model layers according to an embodiment of the present invention.

Referring now to FIG. 4, an exemplary set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized.

Examples of workloads and functions which may be provided from this layer include: mapping and navigation 91; software development and lifecycle management 92; virtual classroom education delivery 93; data analytics processing 94; transaction processing 95; and, more particularly relative to the present invention, the query expansion method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented query expansion method, comprising:
   establishing a context of a query to execute the query within a search index by:
   labeling phrases of interest of the query;
   expanding of the phrases of interest based on a language model and a topic model using:
   the phrases of interest that are expanded to find relevant documents and/or passages in the search index defined over a corpus in order to identify a context of the query; and
   the phrases of interest in the query are expanded using a query expansion technique to identify phrases of interest (PO) within the query;
   identifying and incorporating an available historical query into the context according to a historical phrase of interest and an expansion of one or more historical phrases of interest; and
   retrieving and displaying one or more search results based on the query and the context of the query as a first visual mark indicating a linkage between, one or more terms of the query and the one or more search results and a second visual mark indicating an alignment between the available historical query and a match to the terms of the query and the search result.

2. The computer-implemented method of claim 1, further comprising:
   receiving indication of a selection of the one or more results;
   learning a relevancy of the established context, based on the selection; and
   eliminating un-selected results from a next query.

3. The computer-implemented method of claim 2, wherein the learning learns the relevancy of the established context based on the selection of the search result such that the context is established based on the learned relevancy.

4. The computer-implemented method of claim 1, wherein the establishing includes incorporating a plurality of available historical queries and comprises incorporating the available historical queries into the context by:
   incorporating previous search results into the context by processing the previous search results through a natural language processor to identify mentions and relations of interest; and
   identifying one or more anaphoric expressions and mapping the one or more anaphoric expressions to sub-spans in previous search results.

5. The computer-implemented method of claim 1, further comprising marking the results with a third visual ark to indicate a relationship between expansion matches in the search result and terms of the query.

6. The computer-implemented method of claim 1, wherein the available historical query is selectively excluded from establishing the context.

7. The computer-implemented method of claim 1, wherein the expanding of the phrases of interest is selected from a group consisting of:
   phrases of interest within the query;
   natural sounding expansions;
   a current semantic space of the query; and
   a synonym.

8. The computer-implemented method of claim 1, wherein said establishing the context, further comprises associating the terms of the query to the search result of the available historical query, and
   wherein creating a reference for the context between the query and a second query.

9. The computer-implemented method of claim 1, embodied in a cloud-computing environment.

10. A computer program product for query expansion, the computer program product comprising a computer-readable storage medium having program instructions embodied therewith, the program instructions executable by a computer to cause the computer to perform:
    establishing, a context of a query to execute the query within a search index by:
    labeling phrases of interest of the query;
    expanding of the phrases of interest based on a language model and a topic model using:
    the phrases of interest that are expanded to find relevant documents and/or passages in the search index defined over a corpus in order to identify a context of the query; and
    the phrases of interest in the query are expanded using a query expansion technique to identify phrases of interest (POT) within the query;
    identifying and incorporating an available historical query into the context according to a historical phrase of interest and an expansion of one or more historical phrases of interest; and
    retrieving and displaying one or more search results based on the query and the context of the query as a first visual mark indicating a linkage between one or more terms of the query and the one or more search results and a second visual mark indicating an alignment between the available historical query and a match to the terms of the query and the search result.

11. The computer program product of claim 10, wherein the establishing includes incorporating a plurality of available historical queries and comprises incorporating the available historical queries into the context by:
    incorporating previous search results into the context by processing the previous search results through a natural language processor to identify mentions and relations of interest; and
    identifying one or more anaphoric expressions and mapping the one or more anaphoric expressions to sub-spans in previous search results.

12. The computer program product of claim 10, further comprising marking the results with a third visual mark to indicate a relationship between expansion matches in the search result and terms of the query.

13. The computer program product of claim 10, wherein the available historical query is selectively excluded from establishing the context.

14. The computer program product of claim 10, wherein the expanding of the phrases of interest is selected from a group consisting of:
   phrases of interest within the query;
   natural sounding expansions;
   a current semantic space of the query; and
   a synonym.

15. The computer program product of claim 10, wherein the learning learns the relevancy of the established context based on the selection of the search result such that the context is established based on the learned relevancy.

16. The computer program product of claim 10, wherein said establishing the context, further comprises associating the terms of the query to the search result of the available historical query.

17. A query expansion system, comprising:
   a processor; and
   a memory, communicably coupled to the processor, the memory storing program instructions to cause the processor to perform:
   establishing, a context of a query to execute the query within a search index by:
      labeling phrases of interest of the query;
      expanding of the phrases of interest based on a language model and a topic model using:
      the phrases of interest that are expanded to find relevant documents and/or passages in the search index defined over a corpus in order to identify a context of the query; and
      the phrases of interest in the query are expanded using a query expansion technique to identify phrases of interest (POI) within the query;
      identifying and incorporating an available historical query into the context according to a historical phrase of interest and an expansion of one or more historical phrases of interest; and
   retrieving and displaying one or more search results based on the query and the context of the query as a first visual mark indicating a linkage between one or more terms of the query and the one or more search results and a second visual mark indicating an alignment between the available historical query and a match to the terms of the query and the search result.

18. The system of claim 17, wherein the program instructions further cause the processor to lean a relevancy of the established context based on a selection of the search result.

19. The system of claim 17, embodied in a cloud-computing environment.

* * * * *